Patented July 23, 1940

2,208,580

UNITED STATES PATENT OFFICE 2,208,580

PLASTIC ADHESIVE PASTE AND METHOD OF PRODUCING SAME

Eugen Hirsch, Brooklyn, N. Y., assignor to E. I. du Pont de Nemours & Company, Wilmington, Del., a corporation of Delaware No Drawing. Application February 23, 1937, Serial No. 127,173

10 Claims. (Cl. 134—23.9)

This invention relates to a new composition of matter which may be broadly described as a plastic adhesive paste and a method of preparing it. By a plastic adhesive paste I mean a paste or liquid which will have adhesive properties but which will remain plastic or pliable so it will not crack or split when dry.

As a specific example of materials and methods to be used in preparing my new composition, I first mix together the following ingredients in the proportions indicated by the quantities shown:

I

|                     | Grams |
|---------------------|-------|
| Hydrochloric acid   | 10    |
| Coal tar            | 200   |
| Congo gum           | 350   |
| Urea                | 50    |

This mixture is then heated for twenty minutes at approximately 240° F. I then add the following ingredients in the proportions indicated by the quantities shown. These may be added while the mixture, or compound, is still hot, or after it has been allowed to cool:

|                         | Grams |
|-------------------------|-------|
| 24% ammonium hydroxide  | 25    |
| Caustic soda            | 5     |
| Citric acid             | 5     |
| Soft water              | 700   | and stir the mixture until all the constituents are intimately intermixed.

As a second and separate step, I mix together the following ingredients in the proportions indicated by the quantities shown:

II

|                   | Grams |
|-------------------|-------|
| Casein            | 80    |
| Animal glue       | 120   |
| Borax             | 6     |
| Sodium benzoate   | 8     |
| Oil of wintergreen| 5     |
| Soft water        | 300   |

This mixture is then cooked and stirred for approximately forty minutes at approximately 160° F. It is then allowed to cool to approximately 70° F., and enough of the mixture produced according to the first step (I) above is then added to the total mixture produced in the second step to make the total quantity equal to 1000 grams.

The product is a somewhat viscous, milky substance which will weigh about ten pounds per gallon. It may be used for any purpose for which glue is used, but has many additional uses and advantages over any other adhesive known to me. It is thin enough so it may be applied smoothly and evenly, and dries very quickly, leaving a clean layer of material which retains its pliability and is elastic. It may be applied, for example, by means of a brush, or simply with one's fingers, to the end of a stack of loose sheets of paper, and after a few minutes' drying will be found to have bound them firmly into a pad, with each sheet entirely separate and capable of being turned completely over so that it lies flat against the next adjacent sheet above or below it.

It will be understood that the invention is not restricted to the specific ingredients listed above. The important feature of my invention is first the mixture of coal tar with Congo gum in a solution, and, second, the mixture of coal tar and Congo gum with casein in a solution, the other ingredients contributing to this basic purpose, or providing a finished product in more desirable commercial form.

In place of hydrochloric acid I may use any mineral acid which acts as a solvent for coal tar. I may use any of the numerous kinds of coal tar, as this acts as a plasticizer for the composition. In place of Congo gum I may use any natural resin which will act as a binder for the composition, or any synthetic resin having the properties of natural resins. The urea acts as a dispersing agent, and I may use in its place any suitable compound of nitrogen which has similar properties.

The mixture of hydrochloric acid, tar, Congo gum and urea reacts to form a resin which solidifies as it cools. The ammonium hydroxide, caustic soda, and citric acid act as solvents for this resin so that it goes into solution. Any suitable alkaline compounds which will have this effect may be used instead of the ammonium hydroxide and caustic soda. For soft water I may use snow or rain water, or distilled water.

Of the materials used in the second step, the casein acts as a binder. The adhesive property of my composition does not depend upon the quantity of animal glue used, and this quantity is not critical. It may be increased somewhat, decreased, or even omitted altogether without seriously affecting the properties of the composition. I prefer, however, to use approximately the quantity indicated. The borax acts as a solvent for the casein, and any inorganic alkaline salt having the same properties may be used. Sodium benzoate is, of course, used for its preservative properties, and the oil of wintergreen for its odor. These substances may be omitted altogether without affecting the properties of the composition.

Having thus described my composition and the method of its preparation, what I claim is:

1. A substantially neutral plastic adhesive composition comprising the coaction product of a resin formed by reaction of hydrochloric acid, tar, Congo gum, and urea, said resin being intimately intermixed with ammonium hydroxide, caustic soda, citric acid, casein, borax, and water.

2. A substantially neutral plastic adhesive composition comprising the coaction product of a resin formed by reaction of hydrochloric acid, tar, Congo gum, and urea, said resin being dissolved and intermixed with ammonium hydroxide, caustic soda, and citric acid, and then further intimately admixed with casein and a solvent therefor.

3. A substantially neutral plastic adhesive composition comprising the coaction product of hydrochloric acid, tar, Congo gum, urea in resin forming proportions, ammonium hydroxide, caustic soda, citric acid, and water, intimately admixed with casein, animal glue, borax and water.

4. A substantially neutral plastic adhesive composition comprising the coaction product of hydrochloric acid, tar, Congo gum, urea in resin forming proportions, ammonium hydroxide, caustic soda, citric acid and water, intimately admixed with casein, animal glue, borax, sodium benzoate, oil of wintergreen, and water.

5. A substantially neutral plastic adhesive composition comprising the coaction product of a mineral acid, a tar, a resin and urea in resin forming proportions, dissolved in alkaline compounds and citric acid, and intimately admixed with casein, and a solvent for the casein.

6. A substantially neutral plastic adhesive composition comprising the coaction product of a mineral acid, a tar, a resin, and urea in resin forming proportions, dissolved in alkaline compounds and citric acid, and intimately admixed with casein, a solvent for the casein, and water.

7. The substantially neutral plastic adhesive composition comprising the coaction product of a resin formed by reacting tar and resin with a solvent for the tar and a dispersing agent for the tar and resin, said resin being dissolved in alkaline compounds and citric acid, and intimately intermixed with casein and a solvent for the casein.

8. A substantially neutral plastic adhesive composition comprising the coaction product of a resin formed by reacting substances within the classes including the following specific substances: hydrochloric acid, tar, Congo gum, and urea, ammonium hydroxide, caustic soda and citric acid, said resin being intimately admixed with the following specific substances: casein, animal glue, and borax.

9. The method of preparing a plastic adhesive which consists as a first step in mixing the following substances in the proportions indicated by the quantities shown:

| | Grams |
|---|---|
| Mineral acid | 10 |
| Tar | 200 |
| Resin | 350 |
| Urea | 50 | heating said substances approximately twenty minutes at approximately 240° F., adding thereto the following substances in the proportions indicated by the quantities shown:

| | Grams |
|---|---|
| Alkali | 30 |
| Citric acid | 5 | and adding to said substances approximately 700 grams of soft water; and as a second step mixing substances of the classes including the following specific substances in approximately the proportions indicated by the quantities shown:

| | Grams |
|---|---|
| Casein | 80 |
| Animal glue | 120 |
| Borax | 6 | adding thereto 300 grams of soft water, stirring and heating approximately forty minutes at approximately 160° F., then cooling to approximately 70° F., and adding enough of the composition prepared in the first step to the entire composition prepared in the second step to make the total weight equal to 1000 grams.

10. In the method of preparing a plastic adhesive which consists, as a first step, in mixing the following specific substances in the proportions indicated by the quantities shown:

| | Grams |
|---|---|
| Hydrochloric acid | 10 |
| Tar | 200 |
| Congo gum | 350 |
| Urea | 50 | heating said substances approximately twenty minutes at approximately 240° F., adding thereto the following specific substances in approximately the proportions indicated by the quantities shown:

| | Grams |
|---|---|
| 24% ammonium hydroxide | 25 |
| Caustic soda | 5 |
| Citric acid | 5 | and adding to said substances approximately 700 grams of soft water; and, as a second step, mixing the following specific substances in the proportions indicated by the quantities shown:

| | Grams |
|---|---|
| Casein | 30 |
| Animal glue | 120 |
| Borax | 6 | adding thereto 300 grams of soft water, stirring and heating approximately forty minutes at approximately 160° F., then cooling to approximately 70° F. and adding enough of the composition prepared in the first step to the entire composition prepared in the second step to make the total weight 1000 grams.

EUGEN HIRSCH.